United States Patent [19]

Gerber

[11] 3,896,083

[45] July 22, 1975

[54] HETEROCYCLIC POLYMERS FROM TRIAMINOPYRADINE COMPOUNDS

[75] Inventor: Arthur H. Gerber, University Heights, Ohio

[73] Assignee: Horizons Incorporated, Cleveland, Ohio

[22] Filed: Mar. 4, 1974

[21] Appl. No.: 447,639

[52] U.S. Cl. ........ 260/47 CP; 260/30.2; 260/30.6 R; 260/30.8 R; 260/30.8 DS; 260/32.6 N; 260/49; 260/65; 260/78 TF
[51] Int. Cl. ............................................ C08g 20/32
[58] Field of Search ......... 260/47 CP, 65, 78 TF, 49

[56] References Cited
UNITED STATES PATENTS

| 3,740,140 | 6/1973 | Gerber | 260/295 |
| 3,804,804 | 4/1974 | Gerber et al. | 260/47 |

*Primary Examiner*—Lester L. Lee
*Attorney, Agent, or Firm*—Lawrence I. Field

[57] ABSTRACT

Thermally stable polymers are obtained by cyclodehydration of the precyclized prepolymers which are produced by reaction of acid derivatives such as bis(acid halides), mono(acid halide)anhydrides and dianhydrides, with specific triaminopyridine compounds.

10 Claims, No Drawings

HETEROCYCLIC POLYMERS FROM TRIAMINOPYRIDINE COMPOUNDS

It is well known that aromatic diamines are precursors to polyimides and aromatic tetraamines of the bis-o-diamine type are precursors to polybenzimidazoles, polyimidazopyrrolones, polybenzimidazobenzophenanthrolines, and polyquinoxalines, e.g., as described in my recently published paper in Journal of Polymer Science (Polymer Chemistry Edition) 11,1703 (1973). Many of these polymers have exhibited excellent thermal, chemical, solvent and radiation resistance and have found utility in a variety of forms, such as films, fibers, laminating and adhesive systems, matrices for structural composites and semi-permeable membranes. Unfortunately, the bis-o-diamines are often extremely sensitive to oxidation, often produce gelled polymer, and their use has been severely restricted in commercial applications because of their high cost.

It has been found that specific triaminoaromatics can be successfully polymerized with very reactive acid derivatives, including bis(acid halides), at mild reaction conditions to produce completely gel-free polymers which have excellent solution stability. These polymers in turn can be cyclodehydrated to thermally stable polymers which show improved solubility and/or thermal stability as compared to analogous materials outside the scope of this invention. This improved thermal stability is quite unexpected since polyimides derived from bipyridyl diamines [American Chemical Society, Organic Coating and Plastics Chemistry Preprints, 33, No. 1, 177 (1973)] and a polybenzimidazole derived from the diacid chloride of 2,6-pyridinedicarboxylic acid [Macromolecules, 5, 807 (1972)] have been reported to exhibit poorer thermal stability than the corresponding benzenoid polymers.

Polymers derived from aromatic triamines and mono(acid halide)anhydrides (derived from tribasic acids) or dianhydrides have been reported in Kobunshi Kagaku 24 (267), 50, (1967); J. Macromolecules Science, Chemistry 2 (6) 1275 (1968); J. Polymer Science, Part B 6 (1), 49 (1968); Japanese Patent 70/20,155, and U.S. Pat. No. 3,532,673. These polymers were either prepared in hot (140°–230°C) polyphosphoric acid from the triamine or triamine acid salt or by a two-step process which involved condensation of the free triamine in an aprotic solvent with subsequent cyclodehydration to cyclized polymers. The latter route, unlike the polymerization process of this invention, is extremely sensitive to stoichiometry which if not adhered to strictly, leads to gelled polymer, and also affords polymer solutions with limited stability. Furthermore, it has been reported that conventional triamines such as 1,2,4-triaminobenzene and 3,4,4'-triaminobiphenyl, or their acid salts, produce gelled polymer upon reaction with bis(acid halides) in aprotic solvents.

A process for preparing polyimides has been described in U.S. Pat. No. 3,632,554 wherein the diamine may be partially replaced by up to 60 mole % of a triamine, a tetraamine, or mixtures thereof. A representative triamine and tetraamine therein disclosed, are 2,3,6-triaminopyridine and 2,3,5,6-tetraaminopyridine. The patented process unlike the process utilized in the present invention uses free polyamines and not their acid salts. Furthermore, the amount of diamine replacement in the patented process is limited, but in the process of the present invention, the mole ratios of triamine/diamine or triamine/tetraamine can vary without any such limit, that is they can vary from 99/1 to 1/99 or even more broadly.

One object of this invention is to provide cyclized heterocyclic polymers which are soluble, thermally stable, and which can be easily converted into useful intractable materials by virtue of crosslinking reactions.

Another object of this invention is to provide soluble precyclized polymer precursors to the afore-mentioned cyclized polymers, the said precyclized polymers exhibiting excellent stability following their formation.

A further object of this invention is to provide a method utilizing very mild reaction conditions, for the preparation of the above soluble precyclized polymers.

Still another object of the invention is to produce such polymers from monocyclic monomers which are relatively inexpensive.

The cyclized heterocyclic polymers of this invention contain at least one of the following recurring structural units represented by the Formulae I, II, III or IV.

Formula I

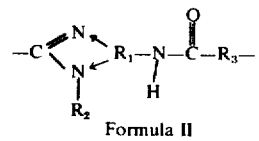

Formula II

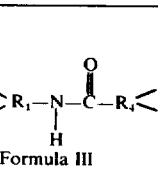

Formula III

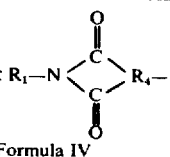

Formula IV

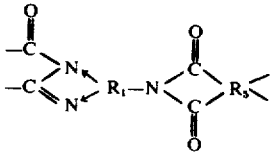

in which
$R_1$ is a trivalent radical represented by the formula

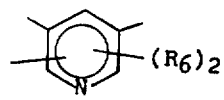

wherein one bond from either an $\alpha$ or $\gamma$ position is bonded to the

—NH— or =N— group in the above cyclized structures I–IV; and wherein each $R_6$ represents a monovalent member selected from the group consisting of hydrogen, methyl, ethyl, propyl, butyl and pentyl, and both $R_6$ members are not required to be the same; and $R_2$ is a monovalent member selected from the group consisting of hydrogen, alkyl, substituted alkyl, alkenyl, substituted alkenyl, arylalkyl, substituted aryalkyl, aryl, substituted aryl, heteroarylalkyl, heteroaryl, substituted heteroaryl, with aryl and heteroaryl including monocyclic, linear bicyclic and fused ring structures, in which typical substituents within the scope of this invention include: methyl, phenyl, pyridyl, F (aromatic), Cl (aromatic), —CN, —COOH and its salts, —COOC$_6$H$_5$, —SO$_3$H and its salts, —SH, thioaryl, thioalkyl, —CH=CHC$_6$H$_5$, and N, N,N-(dialkylamino).

Suitable $R_2$'s include the following which are intended to be merely illustrative and not exhaustive of suitable groups which may be $R_2$: ethyl, methyl, propyl, butyl, pentyl, allyl, crotyl, phenyl, biphenyl, pyridyl, quinolyl, N,N-(dialkylamino)-alkyl, —C$_6$H$_4$COOH and salts thereof, —C$_6$H$_4$SO$_3$H and salts thereof;

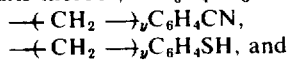
—(CH$_2$—)$_y$C$_6$H$_4$SH, and

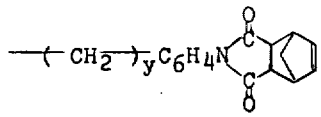

wherein y is 0, 1, or 2.

$R_3$, $R_4$, and $R_5$ are divalent, trivalent, and tetravalent radicals respectively, selected from the following structural types: aliphatic, cycloaliphatic, alkenyl, perfluoroalkyl, perfluoropolyalkylene oxide, aromatic and heteroaromatic, and inorganic/organic radicals, the carbocyclic and heterocyclic radicals having a single, multiple or fused ring structure, the multiple ring structures including polyarylenes with 2 to 9 aryl rings in which the aryl groups are bonded directly to each other or bridged by a divalent member selected from the group consisting of alkylene with up to 3 carbon atoms, perfluoroalkylene of 2 to 10 carbon atoms, —O—,

—S—,

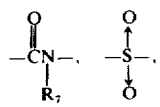

—CH=CH—, 5- and 6-membered heteroaromatics containing at least one nitrogen atom, and mixtures thereof, and substituted aromatic radicals where the substituents are selected from lower alkyl, F, Cl, —CN, —SO$_3$H, and

the inorganic/organic radicals consisting of ferrocenyl, carboranyl, and biaryls separated by at least one phosphorus atom or by at least one silanyl or siloxanyl group, and mixtures thereof; $R_7$ represents H, lower alkyl, or phenyl.

The polymers represented by Formulae I–IV are preferably prepared from the linear precyclized polyamides, V, VI, and VII, and acid salts thereof, by a cyclodehydration reaction.

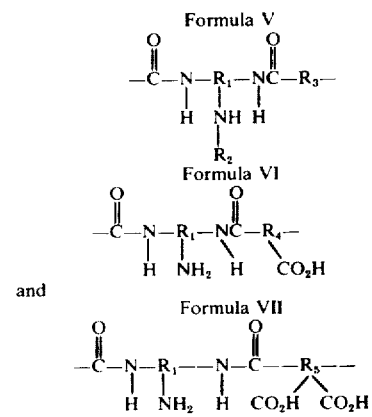

wherein each of $R_1$, $R_2$, $R_3$, $R_4$, and $R_5$ has the meanings previously given to it in Formulas I–IV.

The cyclodehydration of precyclized polymers V–VII to polymers I–IV is accomplished by known methods including heating under vacuum or inert atomsphere; in tetramethylene sulfone or diphenyl sulfone, or mixtures thereof; in polyphosphoric acid; with molten Lewis acids such as antimony trichloride; or with other chemical reagents, such as organic tertiary amines. The method selected will depend to some extent on the specific material being processed.

The precyclized polymers (V, VI, and VII) are prepared by processes essentially those described in U.S. Pat. No. 3,783,137 and in U.S. patent application Ser. No. 151,601 filed June 9, 1971. This process involves reacting an acid salt of a triaminopyridine represented by the formula

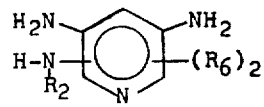

with a substantially equimolar amount of acid derivative in a polar aprotic solvent at temperatures ranging from about −10°C to about 70°C and preferably below about 40°C to afford soluble high molecular weight precyclized intermediates (V, VI and VII). Preferred acid salts of the triaminopyridine are those derived from HCl, HBr, H$_3$PO$_4$, CF$_3$CO$_2$H, alkanesulfonic, and perfluoroalkane sulfonic acids. When the acid derivative is a bis(acid halide) or mono(acid halide)anhydride, the halogen is Cl, Br or F.

Preferred aprotic polar organic solvents are those which are at least in part, solvents for at least one of the reactants and which, under the reaction conditions used, do not react with either of the reactants (excluding salt-formation) and which are preferably solvents for the resulting polymer. Suitable aprotic solvents in the polymerization process of this invention include N,N-dimethylformamide, N,N-dimethylacetamide, N-methylpyrrolidinone, N-methylcaprolactam, hexamethylphosphoramide, tetramethylene sulfone, tetramethylurea and dimethylsulfoxide. The above solvents can be used singly, in combination, or in conjunction with aprotic solvents, such as ethers and aromatic hydrocarbons.

By using tetramethylene sulfone with or without diphenyl sulfone as polymerization solvent, cyclized polymers can directly be prepared from monomers. This is accomplished by careful neutralization of acid with alkali (e.g., NaOH or sodium hexafluoroisopropoxide) after formation of precyclized polymer, followed by gradually heating to reflux of sulfone solvent(s), and maintaining temperature. Cyclized polymers so produced may be isolated by washing free of salt(s) and sulfone solvent(s).

The acid derivative [bis(acid halide), mono(acid halide)anhydride, or dianhydride] is preferably added to a mixture of triamine acid salt and solvent. More than one triamine acid salt, and more than one acid derivative may be used providing that the total moles of triamine salt are essentially equal to the total moles of acid derivative. In this manner, interpolymers may be prepared which possess desirable properties, such as increased solubility or processability, not shown by either homopolymer alone.

The polymerization process described above can often be accelerated during the latter stages of polycondensation by addition of acid acceptors such as tertiary organic amines. These amines are preferably added after most of the acid derivative(s) have reacted, the amount of amine being such that about 1.1 to 1.5 equivalents of acid per pyridine ring of monomer remains unneutralized. Suitable amines for this purpose include triethylamine, N-methylmorpholine and di- and trimethylpyridines.

Triamines which have functionally reactive groups other than amine (—NH$_2$ or —NH) are preferably used in small amounts (e.g. up to 25 mole %) as their acid salts to prepare copolymers or terpolymers. The presence of such groups is often desirable for increasing initial polymer solubility or for subsequent crosslinking to intractable materials. These reactive groups include alkenyl,

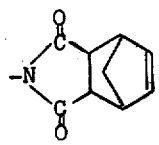

—C$_6$H$_4$—CH=CHC$_6$H$_5$, —CN, —SH, —COOH, —CO$_2$C$_6$H$_5$, and —SO$_3$H. These groups are either thermally labile to condensation reactions or addition reactions or can be thermally condensed with amino or amido groups present elsewhere in the polymer or present in an additive formulated with the polymer.

Acid derivatives suitable for practicing this invention are those represented by the formula:

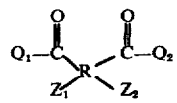

wherein R represents a tetravalent radical possessing the structural nuclei previously described for R$_3$, R$_4$, and R$_5$ with the exception that when R is carboranyl, then Z$_1$ and Z$_2$ are incorporated as boron atoms of the carborane structure (e.g. diacid chloride of 1,7-dicarbadodecaborane(12)-1,7-dicarboxylic acid,

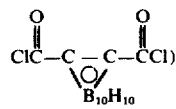

and Z$_1$ and Z$_2$ are each selected from the group consisting of hydrogen, CH$_3$, F, Cl, carbonyl and

where R$_8$ is alkyl of 1 to 4 carbon atoms; and Q$_1$ and Q$_2$ are each selected from oxygen and halogen with the proviso that when a Z group is hydrogen, CH$_3$, halogen,

the corresponding Q group must be halogen, and when a Z group is carbonyl the corresponding Q group must be an oxygen atom bonded to the carbon atom of said carbonyl group; the pair of substituents

and Z$_1$ and the pair of substituents

and Z$_2$ are on carbon atoms which are located 1,2 or 1,3 to each other when R is acyclic paraffinic or cycloparaffinic and located ortho or peri to each other when R is aromatic or heteroaromatic.

Some representative bis(acid halides) which have been found to be suitable for practicing this invention are those derived from the following dicarboxylic acids and their ring substituted derivatives where the subsituents are selected from lower alkyl, F, Cl, —CN, —SO$_3$H,

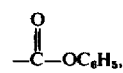

providing that the —CN or

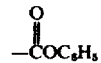

group is neither ortho or peri to a —COOH group, as well as those diacids where one or both —COOH groups have one ortho

group in which $R_H$ is alkyl of 1 to 4 carbon atoms:
terephthalic acid
2,5-dichloroterephthalic acid
2,5-dimethylterephthalic acid
isophthalic acid
4-carbomethoxyisophthalic acid*
5-cyanoisophthalic acid
5-sulfoisophthalic acid
4,6-dicarboethoxyisophthalic acid*
5-carbophenoxyisophthalic acid
fumaric acid
4,4'-stilbenedicarboxylic acid
2,6-nephthalenedicarboxylic acid
4,8-dicarbomethoxy-1,5-naphthalenedicarboxylic acid*
diethylester (non-vicinal) of 3,5-dicarboxy-1,2,3,4-tetrahydro-1-naphthalenesuccinic acid*
*(when $R_2$ of the triamine monomer is H)
2,5-furandicarboxylic acid
2,8-dibenzofurandicarboxylic acid
3,5-pyridinedicarboxylic acid
2,5-pyrazinedicarboxylic acid
2,7-anthraquinonedicarboxylic acid
1,1'-ferrocenedicarboxylic acid
azelaic acid
1,5-cyclooctadiene-1,5-dicarboxylic acid
1,3,5,7-cyclooctatetraene-1,5-dicarboxylic acid
1,4-cyclohexanedicarboxylic acid
bis(p-carboxyphenyl)methyl phosphine oxide
1,2,5-thiadiazole-3,4-dicarboxylic acid
1,3-bis-(γ-carboxyphenyl-n-propyl)-1,1,-3,3-tetramethyl disiloxane
2,5-bis-(m-carboxyphenyl)-1,3,4-oxadiazole
3,4-bis-(p-carboxyphenyl)-1,3-4-oxadiazole
4,4'-sulfonyldimethylene dibenzoic acid
1,7-dicarbadodecaborane(12)-1,7-dicarboxylic acid i.e.

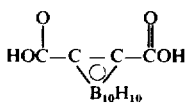

and those represented by the following formula

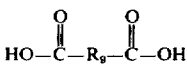

in which $R_9$ represents any of the following:

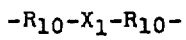

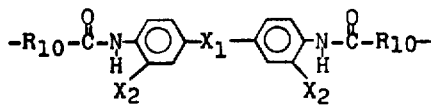

$X_2$=H, OH or SH
both $X_2$'s need not be identical.

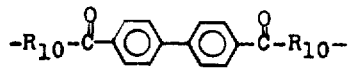

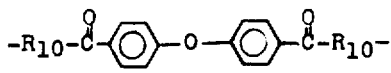

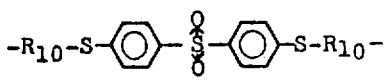

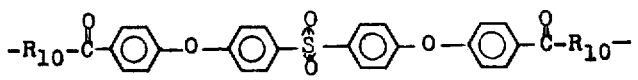

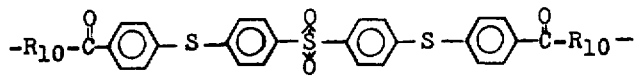

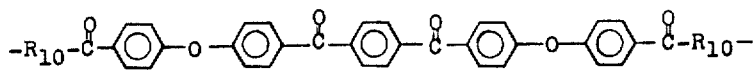

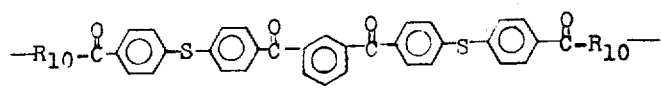

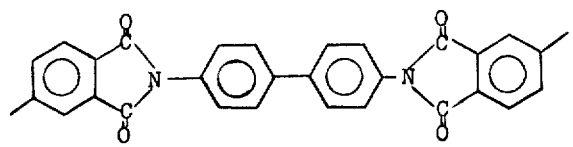

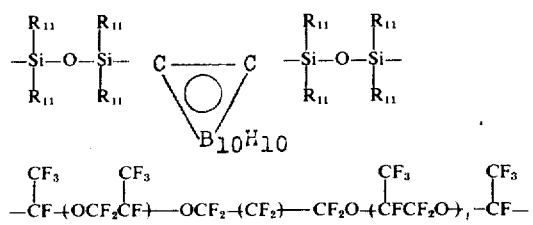

where $R_{10}$ equals m- or p-phenylene and $X_1$ is selected from zero and the divalent radicals alkylene of 1 to 3 carbon atoms, $-(CF_2)_s-$

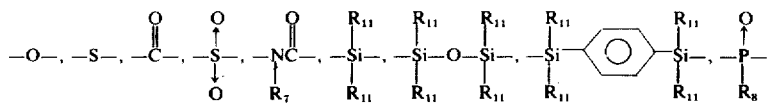

where $R_7$ is H, lower alkyl or phenyl; and $R_{11}$ is methyl or phenyl; $R_8$ is alkyl of 1 to 4 carbon atoms; $r$ and $t$ are integers from 1 to 10 and $s$ is an integer from 2 to 10.

Suitable mono(acid halide) anhydrides and dianhydrides for practicing this invention may be obtained from tribasic and tetrabasic acids, respectively, derived from the above dibasic acids $R(COOH)_2$ by substituted with a —COOH group up to two monovalent groups of R. Said —COOH groups to be introduced will be on the β or γ-carbons of R when R is alkylene or cycloalkylene providing that only one —COOH group is substituted on a given carbon atom, or substituted on the ortho or peri carbon when R is arylene or heteroarylene, providing that three consecutive carbons are not substituted with a —COOH group. Representative mono(acid halide) anhydrides and dianhydrides that have been found suitable for practicing this invention are as follows:

trimellitic anhydride monoacid chloride
3,4,4'-benzophenonetricarboxylic anhydride monoacid chloride
pyromellitic dianhydride
3,3',4,4'-benzophenonetetracarboxylic dianhydride
pyrazinetetracarboxylic dianhydride
1,4,5,8-naphthalenetetracarboxylic dianhydride
bis(3,4-dicarboxyphenoxyphenyl)sulfone dianhydride
1,3-bis(3,4-dicarboxyphenyl)hexafluoropropane dianhydride
3,4-dicarboxy-1,2,3,4-tetrahydro-1-naphthalenesuccinic dianhydride
1,3,5,7-cyclooctatetraene-1,2,5,6-tetracarboxylic dianhydride
2,2-bis(3',4'-dicarboxyphenyl) hexafluoropropane dianhydride High molecular weight acid derivatives are particularly desirable because the resulting precyclized and cyclized polymers possess enhanced solubility and hence processability, but more importantly, a lower percent of water is evolved from the polyamide precursor during cyclodehydration. Decreased volatiles during cyclization lead to decreased voids in the final composition which therefore will possess greater integrity and thermal stability.

One preferred method of tailoring polymer properties involves copolymerization with an acid salt of an aromatic diamine or an aromatic tetraamine, or mixtures thereof, in place of some of the acid salt of the triaminopyridine provided that the total moles of amine(s) are essentially equal to or greater than the total moles of acid reactant(s). There appears to be no limit as to the amount of triamine acid salt that can be replaced by a diamine or tetraamine acid salt, or mixtures thereof, so that the mole ratio of triamine(s) to diamine(s) and/or tetramine(s) can vary from 99/1 to 1/99 or even more broadly. Furthermore, if the $R_2$ group of the triamine is arylene, interpolymerization with diamines may be effected with the free bases instead of their acid salts.

Representative diamines that are suitable for this purpose are those represented by the formula

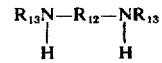

in which $R_{12}$ represents a divalent aromatic radical selected from

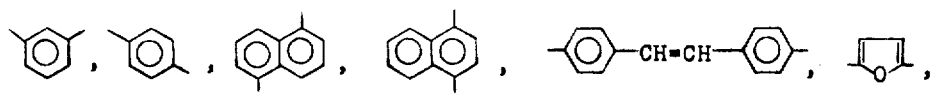

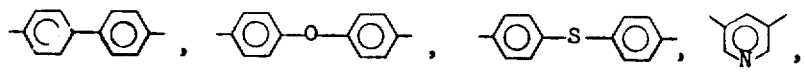

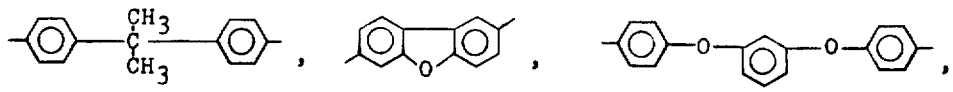

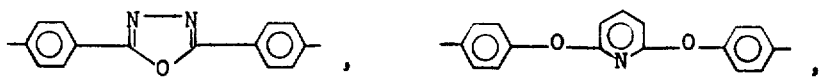

and the ring methylated derivatives of said radicals; $R_{13}$ is H, or $CH_3$.

Derivatives of the above diamines are also suitable. For example, when the acid derivative is a bis(acid halide), diamines which contain a hydroxyl, mercapto or $-SO_2NH_2$ group ortho to one or both amine groups provided that no three consecutive adjacent ring positions are substituted by amine, hydroxyl, mercapto or $-SO_2NH_2$ groups.

Preferred triaminopyridine compounds, as their acid salts, for practicing this invention include:

2,3,5-triaminopyridine
2,3,5-triamino-4-methylpyridine
2,3,5-triamino-6-methylpyridine
2,3,5-triamino-4,6-dimethylpyridine
3,5-diamino-2-anilinopyridine
3,5-diamino-2-(pyridylamino)pyridine
3,5-diamino-2-methylaminopyridine
3,5-diamino-2-anilino-4,6-dimethylpyridine Preferred triamines, as their acid salts, containing functionally reactive groups which have been found to be suitable as comonomers for subsequent polymer crosslinking include:

3,5-diamino-2-allylaminopyridine
3,5-diamino-2-crotylaminopyridine
3,5-diamino-2-stilbylaminopyridine
3,5-diamino-2-(m-R-anilino)pyridine where R =

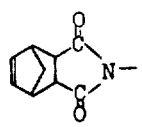

and their ring methylated derivatives of these comonomers. -tetraaminopyridine,

Tetraamine acid salts that are suitable replacements for some of the triaminopyridine salt in the practice of this invention are those derived -tetraaminopyridine, 2,3,5,6-tetraaeminopyridine, 4,4',5,5'-tetraamino-2,2'-bipyridine and those tetraamines disclosed in copending U.S. patent application Ser. No.

The following are examples of preferred tetraamines:
2,3,5,6-tetraaminopyridine 3,5-diamino-2,6-di(methylamino)pyridine
3,5-diamino-2,6-di(anilino)pyridine
3,5-diamino-2,6-di(pyridylamino)pyridine
and the 4-methyl derivatives of these tetraamines.

5,5',6,6'-tetraamino-2,2'-bipyridine and the N-methylated and N-phenylated amino ($\alpha$ or $\gamma$) derivatives of the above 2,2'-bipyridines.

The cyclized polymers of this invention appear to be less vulnerable to oxidative degradation than those in which a ring CH linkage is present. Depending on the specific triamine, from zero to two such CH linkages may remain in the final cyclized polymer, and stability of the polymer appears to increase with decreasing CH content.

By increasing the mole ratio of triamine salt to acid derivative to greater than unity, amine-terminated adducts and uncyclized polymers of lower molecular weight may be obtained. These materials can then be used as reactants for the preparation of high molecular weight polymers which may contain monomer residues other than the two present in the original polymerization.

The acid derivatives employed in the preparation of the polymers of this invention are very moisture sensitive. Reaction with water during polymerization will lead to partial destruction of the acid derivative with attendant stoichiometric imbalance, lowering of molecular weight, and a decrease in thermal stability of the resulting cyclized polymer. This can be a serious problem with triamine salts that are difficult to obtain as highly pure anhydrous materials. It has been found that addition of certain acidic inorganic oxides can scavenge moisture without adversely affecting the polymerization reaction. Both $P_2O_5$ and $B_2O_3$ have been used successfully as in situ drying agents. For example, $P_2O_5$ in sufficient quantity upon prolonged contact with a mixture of the amine acid salt(s) and polar aprotic solvent has been used to remove at least 10 weight % water present in the salt(s). Polymer can subsequently be purged of $P_2O_5$ or $H_3PO_4$ by washing with water or methanol.

The following examples are illustrative of preferred embodiments of this invention and are not to be construed as limiting the invention in any way.

EXAMPLE 1

Precyclized Polymer and Poly(amide-benzimidazole) from 2,3,5-Triaminopyridine Trihydrochloride and 4,4'-Carbonyldibenzoyl Chloride 4,4'-Carbonyldibenzoyl chloride,

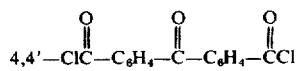

(7.67 g, 0.025 mole), was added over five minutes under a nitrogen atmosphere to a stirred cold mixture of 2,3,5-triaminopyridine trihydrochloride (5.84 g, 0.025 mole) and 45 g N-methylpyrrolidinone. The reaction was maintained at 0°–5°C for 2 hours and then kept at room temperature for four hours. The polymer solution was poured into 175 ml methanol with stirring. The precipitate of precyclized polymer was filtered, washed well with methanol twice and vacuum dried overnight at 50°–55°C. The hydrochloride polymer (9.1 g) was obtained as a yellow powder which was soluble in N,N-dimethylformamide (DMF), dimethylsulfoxide (DMSO), and formic acid and had an inherent viscosity of 0.5 dl/g in DMF (0.5% conc., 30°C). A strongly positive Beilstein test confirmed the presence of chloride.

This polymer was neutralized as follows: the hydrochloride polymer (3.0 g) was dissolved in DMF (25 ml), treated with triethylamine (1 ml) and then precipitated into methanol and purified by filtering, washing with methanol and vacuum drying. The neutral precyclized polymer was soluble in DMF, DMSO and formic acid.

Anal. Calcd. for $C_{20}H_{14}N_4O_3$: C, 67.0; H, 3.9; N, 15.7. Found: C, 67.2; H, 4.2; N, 15.6.

Similarly other acid salts of the above precyclized polymer may be formed by replacing the trihydrochloride salt by the hydrobromide salt or the methanesulfonate salt.

The above precyclized hydrochloride polymer was converted to the cyclized polymer by heating two hours under vacuum at each of the following temperatures; 150°C, 200°C, 300°C, and 350°C. The resulting poly(amide-benzimidazole) was soluble in formic acid, $CF_3CO_2H$, $H_2SO_4$, and methanesulfonic acid.

Anal. Calcd. for $C_{20}H_{10}N_4O$: C, 74.5; H, 3.1; N, 17.4. Found: C, 73.8; H, 3.3; N, 17.2.

An amine terminated precyclized hydrochloride polymer was obtained by reaction of 4,4'-carbonyldibenzoyl chloride (0.0229 mole) with 2,3,5-triaminopyridine trihydrochloride (0.0254 mole) as described above. This polymer could be further extended in molecular weight by reaction in N-methylpyrrolidinone with any one of the following: 2,6-naphthalenediacid dichloride, dodecanodioic acid dichloride, 3,3',4,4'-benzophenonetetracarboxylic dianhydride, or 2,2-bis(3',4'-dicarboxyphenyl)hexafluoropropane dianhydride.

EXAMPLE 2

Attempted Preparation of Precyclized Polymer from 2,3,6-Triaminopyridine Dihydrochloride and 4,4'-Carbonyldibenzoyl Chloride The procedure of Example 1 was followed except that 2,3,6-triaminopyridine dihydrochloride (0.025 mole) was substituted for the 2,3,5-triaminopyridine trihydrochloride. The product isolated by precipitation with 175 ml aqueous methanol (1v/1v) was obtained in poor yield and had an inherent viscosity of less than 0.1 dl/g in DMF (0.5% conc., 30°C).

EXAMPLE 3

Attempted Preparation of Precyclized Polymer from 1,2,4-Triaminobenzene Dihydrochloride and 4,4'-Carbonyldibenzoyl Chloride The procedure of Example 1 was followed except that 1,2,4-triaminobenzene dihydrochloride (0.025 mole) was substituted for the 2,3,5-triaminopyridine trihydrochloride. Upon addition of the last 25 mole % of dihydrochloride gelation resulted.

EXAMPLE 4

Precyclized Polymer and Poly(ImideImidazopyrrolone) from 2,3,5-Triaminopyridine Trihydrochloride and 3,3'4,4'-Benzophenonetetracarboxylic Dianhydride The procedure of Example 1 was followed except that 3,3',4,4'-benzophenonetetracarboxylic dianhydride (0.025 mole) was substituted for the 4,4'-carbonyldibenzoyl chloride, and the reaction was conducted 2 hours at 5°–10°C and 17 hours at room temperature. An essentially quantitative yield of precyclized hydrochloride polymer was obtained which was soluble in DMF, DMSO, and $H_2SO_4$. The chloride-free precyclized polymer was obtained by neutralization of the HCl in a manner similar to that described in Example 1.

Anal. Calcd. for $C_{22}H_{14}N_4O_7$: C, 59.2; H, 3.1; N, 12.6. Found: C, 59.0; H, 3.4; N, 12.5.

The precyclized polymer above was cyclodehydrated to poly(imide-imidazopyrrolone) by heating under vacuum as described in Example 1. The cyclized polymer retained 97% of its original weight after 100 hours exposure to air at 600°F (316°C).

EXAMPLES 5–18

The precyclized polymers and acid salts thereof and cyclodehydrated polymers of Examples 5–18 were prepared following the procedures of Examples 1 and 4 except employing the indicated amine acid salt(s) (0.100 mole) and acid derivatives (0.100 mole) and N-methylpyrrolidinone (175 ml), unless stated otherwise.

| Ex. | Amine Acid Salt(s)[a] | Acid Derivative[b], 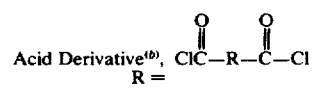 R = |
|---|---|---|
| 5. | 6-methyl-TAP·3HBr | 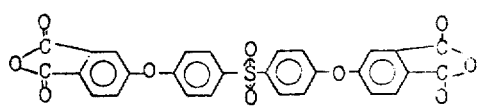 |

—Continued

| Ex. | Amine Acid Salt(s)[a] | Acid Derivative[b], $Cl\overset{O}{\overset{\|}{C}}-R-\overset{O}{\overset{\|}{C}}-Cl$ R = |
|---|---|---|
| 6. | 4,6-dimethyl-TAP·3HCl | 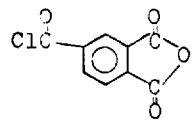 |
| 7.[c][h] | 2-anilino-DAP·2HCl | 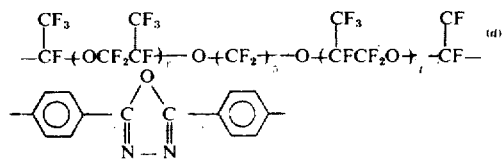 |
| 8. | TAP·3HCl (0.050 mole), 2-anilino-DAP·2HCl (0.050 mole) | 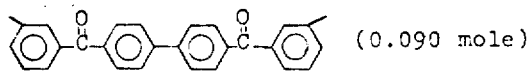 |
| 9. | 2-benzylamino-DAP·3CH₃SO₃H (0.095 mole), 2-(p-sulfonailino)-DAP·2CH₃SO₃H (0.005 mole) | 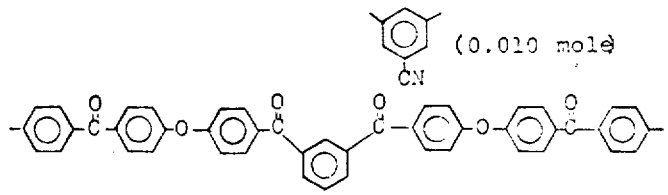 (0.090 mole) |
| 10. | 2-pyridylamino-4,6-dimethyl-DAP·3HCl | 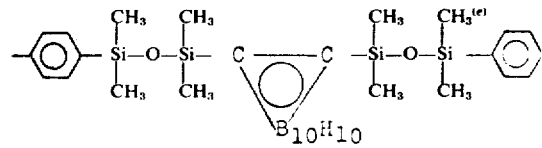 (0.010 mole) |
| 11. | 2-(n-butylamino)-6-methyl-DAP·3HBr | 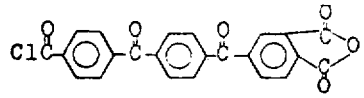 |
| 12. | 3,4,5-triamino-pyridine·3HCl | 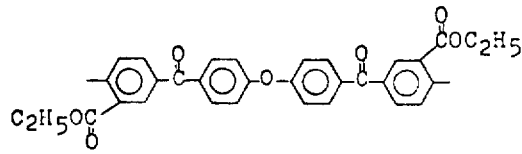 |
| 13. | 3,4,5-triamino-2,6-dimethyl-pyridine·2CF₃SO₃H |  |
| 14. | TAP·3HCl (0.095 mole), 2-p-stilbyl-amino-TAP·2HCl (0.005 mole) | |
| 15.[h] | 2-(p-CH₃S-anilino)-DAP·2HCl | 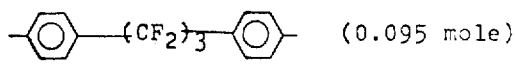 (0.095 mole) 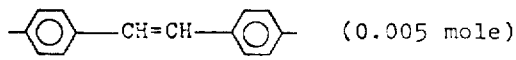 (0.005 mole) |
| 16. | 4,6-dimethyl-TAP·3HCl (0.090 mole), 2-p-cyanobenzylamino-DAP·2CH₃SO₃H (0.010 mole) | 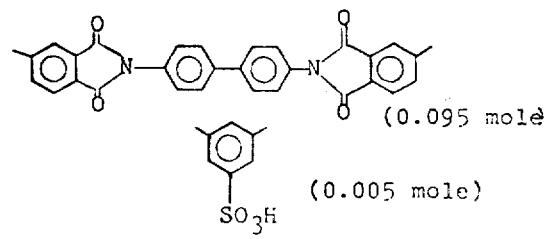 (0.095 mole) (0.005 mole) |

| Ex. | Amine Acid Salt(s)[a] | Acid Derivative[b] $ClCRCCl$ with $O$ $O$ double bonds, $R=$ |
|---|---|---|
| 17.[f] | TAP·3HCl (0.090 mole), 2-(m-R1-anilino)-DAP·2HCl (0.010 mole) where R1 = 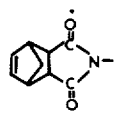 | 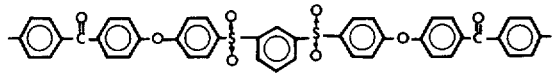 |
| 18.[g] | TAP·3CH$_3$SO$_3$H | 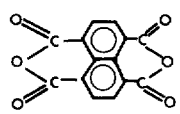 |

[a] DAP = 3,5-diaminopyridine; TAP = 2,3,5-triaminopyridine.
[b] Acid derivative is a bis(acid chloride) unless indicated otherwise.
[c] Hexamethylphosphoramide/F[CF(CF$_3$)CF$_2$CHFCF$_3$ (lv/lv) was substituted for the N-methylpyrrolidinone.
[d] As the diacid fluoride, r and t are integers such that the average molecular weight is 1300.

[e] 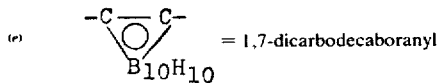 = 1,7-dicarbodecaboranyl

[f] Cyclodehydrated product is insoluble in CH$_3$SO$_3$H. In contrast, in the absence of the R$_1$-anilino comonomer and using 0.100 mole TAP·3HCl a product soluble in CH$_3$SO$_3$H was obtained.
[g] Reaction further continued 10 hours at 40–45°C after reaction at room temperature.
[h] Cyclodehydrated product obtained by heating precyclized polyamide in polyphosphoric acid.

EXAMPLES 19–24

The procedure of Example 1 was followed except that the 2,3,5-triaminopyridine. 3HCl was substituted or partially replaced by the indicated triamine and diamine or tetraamine acid salts. In this manner the corresponding precyclized and cyclized polymers of Examples 19–24 were obtained.

| Ex. | Triamine Acid Salt (mole %) | Di- or Tetraamine Acid Salt (mole %) |
|---|---|---|
| 19. | 2,3,5-triaminopyridine·3HCl (50) | 3,5-diamino-2,6-di(anilino)-pyridine·2HCl (50) |
| 20. | 2,3,5-triamino-4,6-dimethyl-pyridine·3HCl (45) | 2,3,5,6-tetraamino-4-methyl-pyridine·3HCl (45), 4,4'-diaminostilbene·2HCl (10) |
| 21. | 3,5-diamino-2-methylamino-pyridine·3HCl (60) | benzidine·2HCl (40) |
| 22. | 2,3,5-triaminopyridine·3HCl (30) | 3,3'-dimercaptobenzidine·2HCl (40), 4,4',5,5'-tetraamino-2,2'-bipyridine·4HCl (30) |
| 23. | 2,3,5-triamino-4,6-dimethylpyridine·3HCl (50) | 3,3'-dihydroxybenzidine·2HCl (50) |
| 24. | 2,3,5-triamino-4-methyl-pyridine·3HCl (50), 2,3,5-triamino-2-(p-mercapto-anilino)pyridine·2HCl (10) | 2,4-diaminobenzene-sulfonamide (40) |

EXAMPLE 25

The effect of P$_2$O$_5$ on the preparation of amine terminated precyclized polymer derived from 2,3,5-triaminopyridine. 3 HCl, isophthaloyl chloride and terephthaloyl chloride in the presence of water is shown by the following examples:

A. With P$_2$O$_5$:

A mixture of isophthaloyl chloride (0.045 mole) and terephthaloyl chloride (0.045 mole) was added over 30 minutes under a nitrogen atmosphere, to a well stirred mixture (0°–5°C) of P$_2$O$_5$ (5.0 g), water (0.05 mole), 2,3,5-triaminopyridine trihydrochloride (0.10 mole), and N-methylpyrrolidinone (100 g). The mixture of P$_2$O$_5$, amine salt, water, and solvent had been previously stirred under nitrogen 10 hours at 25°C. The reaction was maintained at about 5°C for 3 hours and then kept at room temperature for 4 hours. The polymer solution was poured into a solution of methanol (200 ml) and water (50 ml). The precipitate of precyclized amine terminated polymer (75%) was filtered, washed well with methanol and vacuum dried overnight at 50°–55°C.

B. Without P$_2$O$_5$:

The procedure of Example 25 A was followed except that no P$_2$O$_5$ was employed. Without the P$_2$O$_5$, the yield and molecular weight of precyclized polymer was considerably reduced as compared to the product obtained in Example 25 A.

I claim:
1. Precyclized polyamides consisting essentially of at least one of the following recurring formulae:

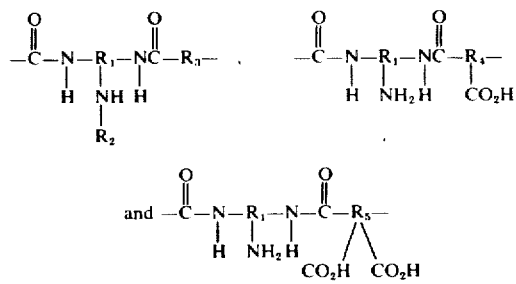

wherein
$R_1$ is a trivalent radical represented by the formula

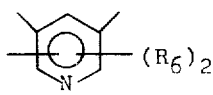

wherein one bond from either an α or γ position is bonded to the —NHR$_2$ or —NH$_2$ group; and all of the $R_1$ groups are not required to be the same in the polyamide;

wherein $R_6$ represents a monovalent member selected from the group consisting of hydrogen, methyl, ethyl, propyl, butyl and pentyl, and both $R_6$ members are not required to be the same;

$R_2$ is a monovalent member selected from the group consisting of hydrogen, alkyl, substituted alkyl, alkenyl, substituted alkenyl, arylalkyl, substituted arylalkyl, aryl, substituted aryl, heterocyclic, substituted heterocyclic, in which said substituents are selected from the group consisting of methyl, phenyl, pyridyl, F(aromatic), Cl(aromatic), —CN, —COOH and its salts, —COOC$_6$H$_5$, —SO$_3$H and its salts, —SH, thioaryl, thioalkyl, —CH=CHC$_6$H$_5$, and N,N-(dialkylamino); and not all of the $R_2$ groups are required to be the same in the polyamide;

$R_3$, $R_4$ and $R_5$ are divalent, trivalent, and tetravalent radicals respectively, selected from the following structural types: aliphatic, cycloaliphatic, alkenyl, perfluoroalkyl, perfluoropolyalkylene oxide, aromatic and heteraromatic, and inorganic/organic radicals, the carbocyclic and heterocyclic radicals having a single, multiple or fused ring structure, the multiple ring structures including polyarylenes with 2 to 9 aryl rings in which the aryl groups are bonded directly to each other or bridged by a divalent member selected from the group consisting of alkylene with up to 3 carbon atoms, perfluoroalkylene of 2 to 10 carbon atoms,

—S—,

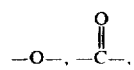

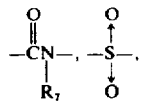

—CH=CH—, 5- and 6- membered heteroaromatics containing at least one nitrogen atom, and mixtures thereof, and substituted aromatic radicals where the substituents are selected from lower alkyl, F, Cl, —CN, —SO$_3$H, and

with the proviso that the —CN, —SO$_3$H, and

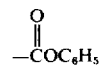

substituents are not ortho or peri to a

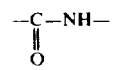

group; the inorganic/organic radicals consisting of ferrocenyl, carboranyl, and biaryls separated by at least one phosphorus atom or by at least one silanyl or siloxanyl group, and mixtures thereof; $R_7$ represents H, lower alkyl, or phenyl; and every $R_3$, $R_4$ and $R_5$ is not required to be the same as every other $R_3$, $R_4$ and $R_5$; and acid salts thereof, of an acid selected from the group consisting of HCl, HBr, H$_3$PO$_4$, CF$_3$COOH, alkanesulfonic and perfluoroalkane sulfonic acids.

2. Precyclized polyamides and acid salts thereof of claim 1 consisting of recurring units represented by the formula:

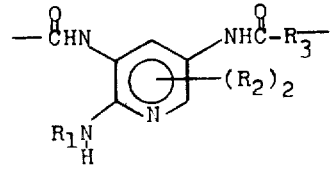

wherein each $R_1$ is selected from the group consisting of H, methyl, phenyl, benzyl, and pyridyl;

each $R_2$ is selected from the group consisting of H and methyl and both $R_2$'s are not required to be the same;

$R_3$ is a divalent radical selected from the group consisting of m-phenylene, p-phenylene,

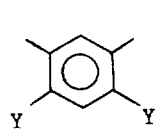 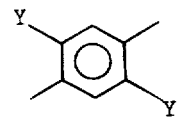

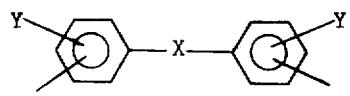

wherein X is selected from the group consisting of a divalent covalent bond, —O—, —S—,

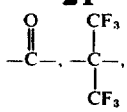

and

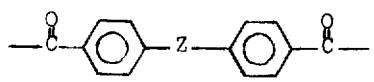

and Y is selected from the group consisting of H, —COOH, and —COOalk, wherein alk is lower alkyl with up to 4 carbon atoms, and both Y's are not required to be the same, with the proviso that when Y is not H, $R_1$ is H; and Z is selected from the group consisting of a divalent covalent bond, —O—, —S—, and

3. Cyclized heterocyclic polymers prepared by cyclodehydration of the polyamides and acid salts thereof of claim 1 and which contain recurring structural units consisting essentially of at least one of the following formulae:

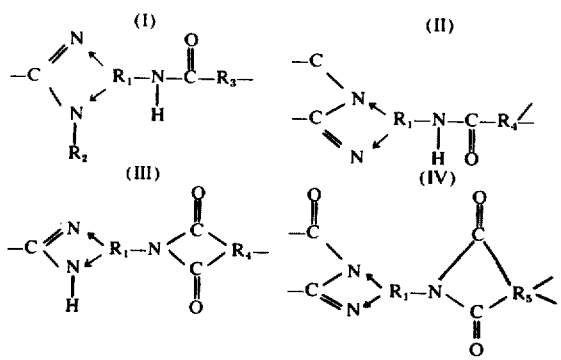

in which $R_1$ is a trivalent radical represented by the formula

wherein one bond from either an α or γ position is bonded to the —N—, —NH— or =N— group in the above cyclized structures I–IV; and wherein each $R_6$ represents a monovalent member selected from the group consisting of hydrogen, methyl, ethyl, propyl, butyl and pentyl, and both $R_6$ members are not required to be the same; and $R_2$ is a monovalent member selected from the group consisting of hydrogen, alkyl, substituted alkyl, alkenyl, substituted alkenyl, arylalkyl, substituted arylalkyl, aryl, substituted aryl, heterocyclic, substituted heterocyclic; said substituents being selected from the group consisting of methyl, phenyl, pyridyl, F(aromatic), Cl(aromatic), —CN, —COOH and its salts, —COOC$_6$H$_5$, —SO$_3$H and its salts, —SH, thioaryl, thioalkyl, —CH=CHC$_6$H$_5$, and N,N-(dialkylamino), with the proviso that each of the several $R_1$'s, $R_2$'s, $R_3$'s, $R_4$'s and $R_5$'s in any recurring unit is not required to be the same as the R's in any other recurring unit, and the symbol → represents possible isomerism.

4. The precyclized polyamides and acid salts thereof of claim 1 wherein at least a portion of the radical

or

is replaced by a divalent aromatic radical.

5. The polymers of claim 4 after cyclodehydration.

6. The precyclized polyamides of claim 1 wherein at least a portion of the radical

or

is replaced by a divalent pyridyl or polypyridyl radical represented by one of the following formulae:

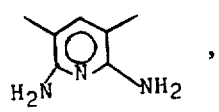

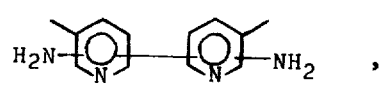

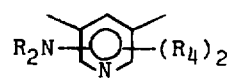

wherein $R_2$ and $R_4$ are as defined in claim 1.

7. The polymers of claim 6 after cyclodehydration.

8. A process for producing the precyclized polyamides of claim 1 which comprises reacting at least one acid salt of a triminopyridine represented by the formula

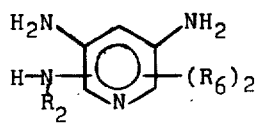

with a substantially equimolar amount of at least one acid derivative in a polar aprotic solvent at temperatures ranging from about −10°C to about 70°C and in the presence of P$_2$O$_5$ wherein the acid derivative is selected from the group consisting of bis(acid halides),

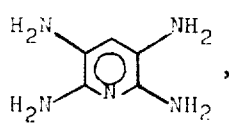
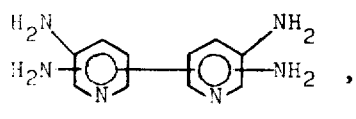

mono(acid halide) anhydrides, and dianhydrides; wherein $R_2$ and $R_6$ are as defined in claim 1, and the acid in said acid derivative is selected from the group consisting of HCl, HBr, $H_3PO_4$, $CF_3COOH$, alkanesulfonic and perfluoroalkanesulfonic acids.

9. The process of claim 8 wherein the pyridyl acid salt is partially replaced by at least one acid salt of an aromatic diamine or an aromatic amine represented by the formulae:

wherein $R_2$ and $R_4$ are as defined in claim 1.

10. The polymers of claim 3 in which at least some of the $R_2$ groups are selected from the group consisting of allyl, crotyl, $C_6H_5CH=CH-C_6H_4-$, and

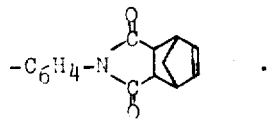

* * * * *